United States Patent
Asente (12) 
(10) Patent No.: US 6,310,622 B1
(45) Date of Patent: Oct. 30, 2001

(54) AUTOMATIC GRAPHICAL PATTERN PLACEMENT AND ADJUSTMENT

(75) Inventor: Paul J. Asente, La Honda, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/056,926

(22) Filed: Apr. 7, 1998

(51) Int. Cl.[7] .................................................. G06T 11/20
(52) U.S. Cl. .................... 345/441; 345/433; 345/436; 345/438; 345/440; 345/442
(58) Field of Search .................... 345/433, 431, 345/440, 441, 436, 438, 442

(56) References Cited

U.S. PATENT DOCUMENTS

| | | | |
|---|---|---|---|
| 5,831,632 | * 11/1998 | Schuster et al. | 345/441 |
| 5,883,636 | * 11/1998 | Hayashi et al. | 345/441 |
| 5,926,186 | * 7/1999 | Itoh et al. | 345/433 |

OTHER PUBLICATIONS

Fractal Design Expression: User Guide for Macintosh® and Windows®, Fractal Design Corporation, pp. 155–163.

Fractal Design Expression: Creative Techniques Guide for Macintosh® and Windows®, Fractal Design Corporation, pp. 1–5.

Fractal Design Expression: User Guide for Macintosh® and Windows®, Fractal Design Corporation, pp. 2–3, 11–12, 14–15, 17, 53–55, 60, 92–96, 102–108, 115–122.

Adobe After Effects®, User Guide for use with Apple Macintosh Computers, version 3.0, Adobe® Systems Incorporated, 1994–1995, pp. 283–303.

FreeHand 5.0 User Manual, Macromedia, Chaters 3, 5, 7, (pp. 58–179), 1991.*

* cited by examiner

Primary Examiner—Mark Zimmerman
Assistant Examiner—Kimbinh T. Nguyen
(74) Attorney, Agent, or Firm—Fish & Richardson P.C.

(57) ABSTRACT

Methods and apparatus implementing a technique for positioning and editing graphical elements repeated along a path in an electronic document. The technique includes creating an enhanced path, which has a graphical element, a path, and a set of one or more reproduction parameters specifying how copies of the element are to be displayed along the path; drawing copies of the element in an electronic document according to the enhanced path; allowing a user to edit the enhanced path; and redrawing copies of the element according to the edited enhanced path.

18 Claims, 5 Drawing Sheets

AUTOMATIC GRAPHICAL PATTERN PLACEMENT AND ADJUSTMENT

BACKGROUND OF THE INVENTION

This invention relates to automatic graphical element placement.

Using modern graphics programs, such as the drawing program Adobe Illustrator®, produced by Adobe Systems Incorporated of San Jose, Calif., a user is able to select a graphical pattern for a drawing, and then place individual instances of the pattern wherever desired on the drawing being created. For example, the user may desire to place a border around a drawing. To create the border, the user would select a graphical pattern and then place instances of the pattern around the periphery of the drawing.

To save the user time in individually placing the graphical patterns so as to form a border or other shape, certain programs support a tiling process for placing graphical patterns or other shapes such that graphically pleasing borders can be produced automatically. One such program is described in U.S. Ser. No. 08/580,472, filed Dec. 28, 1995, and entitled "AUTOMATIC GRAPHICAL PATTERN PLACEMENT", incorporated herein by reference. The user sketches or selects a path on an electronic document, and selects a graphical pattern to apply to the path. The program then automatically places instances of the pattern along the path such that the graphical pattern follows the orientation and curvature of the path. In this manner, graphically pleasing borders or shapes can be produced with only a minimal amount of user time. However, sometimes the user prefers to use shapes other than regular tiles, and prefers that such graphical elements be positioned and oriented in a less regular or rigid fashion. It is time consuming for the user to select each individual graphical element manually and alter the image separately.

SUMMARY OF THE INVENTION

The invention provides methods and apparatus implementing techniques for placing graphical elements along a path.

In general, in one aspect, the invention provides methods and apparatus and computer programs implementing the methods, for drawing in an electronic document. The methods include creating an enhanced path, the enhanced path including a graphical element, a path, and a set of one or more reproduction parameters specifying how copies of the element are to be displayed along the path; drawing copies of the element in an electronic document according to the enhanced path; editing the enhanced path in response to a user request; and redrawing copies of the element according to the edited enhanced path.

Advantageous implementations of the invention include one or more of the following features. Editing the enhanced path includes altering the path. Editing the enhanced path includes altering a parameter. Editing the enhanced path includes altering a plurality of parameters. The parameters include: size of the copies, size range of the copies, method by which the size is determined within a range, spacing of the copies, spacing range of the copies, method by which the spacing is determined within a range, angle of rotation, range of rotation angles, method by which the rotation angle is determined within a range, whether rotation angle is measured from the path or from the document. The parameters further include displacement from the path, range of displacement from the path, method by which the displacement is determined within a range, and color. Altering the enhanced path includes computing a darkness value for the path; comparing the computed darkness value to a preset threshold value; mapping each color in the graphical element to a new color, wherein the new color is between white and the path color if the darkness value is between white and the threshold value, the new color is set to the path color if the darkness value is equal to the threshold value, and the new color is set to a color between the path color and black if the darkness value is between the threshold value and black. Altering the enhanced path includes determining the color space of the graphical element component colors; and mapping the graphical element component colors to other colors in the same color space. Altering the enhanced path includes converting the color of graphical design components into a hue, saturations and brightness (HSB) color space; biasing hue values of a key color, a graphical element color, and a path color; mapping the hue values of the key color, the graphical element color, and the path color; transforming saturation and brightness values; unbiasing the hue values; converting the resulting color into original color space of the path color; and applying the resulting color to components of graphical elements. A user interface is provided that includes a plurality of input fields capable of accepting numeric values that specify parameters selected from the group consisting of size of the copies, size range of the copies, spacing of the copies, spacing range of the copies, displacement from the path, range of displacement from the path, angle of rotation, and range of rotation angles; a plurality of menu elements capable of indicating parameters selected from the group consisting of method by which the size is determined within a range, method by which the spacing is determined within a range, method by which the displacement is determined within a range, method by which the rotation angle is determined within a range, and whether rotation angle is measured from the path or from the document; and an interface element by which the user can specify a color for the path.

One advantage of the invention is that it permits a user to position repeated instances or copies of a selected graphical element along a user-defined path automatically, and to adjust the path after the graphical elements have been placed. An instrance or a copy is a reproduction of the original; however, the reproduction need not be identical—it can be changed in size, orientation, color, or otherwise, and can be deformed to conform to the path.

Another advantage of the invention is that it permits a user to vary parameters such as the size, orientation, spacing, and displacement from the path for the graphical elements along the path. The values for the parameters can be set uniformly for all copies of the graphical element, can vary randomly for each graphical element copy, or can vary with another parameter (for example, with the curvature of the path, or with distance along the path) or with user-defined input (such as pressure applied on a pressure-sensitive graphics tablet along the path).

Another advantage of the invention is that it provides a new "scatter brush" drawing tool, which allows a user to place repeated copies of a graphical element along a path in an electronic document according to user-selected parameters such as size of the copies, variation of copy size, the parameter that affects the size variation (such as tablet pressure, path curvature, random variation, and the like), color, spacing between graphical element copies, variation in spacing, the parameter that affects spacing variation, scatter or displacement from the path, variation in displacement, parameter affecting displacement variation, angle of rotation, variation in rotation angle, parameter affecting rotation variation, and whether the rotation is measured with respect to the page or the path. The graphical element copies can be positioned while the user draws the path, or immediately after the user has drawn a path, or can be applied to an existing path.

DETAILED DESCRIPTION

There are several applications (computer programs) useful for creating and/or modifying an electronic document. Such applications generally accept gestural input with the aid of a pointing device (for example, a mouse or graphic tablet), and convert such gestures to graphic representations in the document, typically displayed on a screen or monitor. Drawing or painting "tools" are provided by the application, which alter the method by which a gesture affects the electronic document. Well-designed tools allow the user to achieve desired effects quickly and easily. Some tools permit the user to select an element or portion of the document and further modify or process the element to achieve additional effects. The present invention provides a tool and techniques for positioning a graphical element repeatedly along a selected path in various orientations, sizes, spacings, colors, and displacements from the path, and for altering those parameters after graphical elements have been placed.

Figure 1:
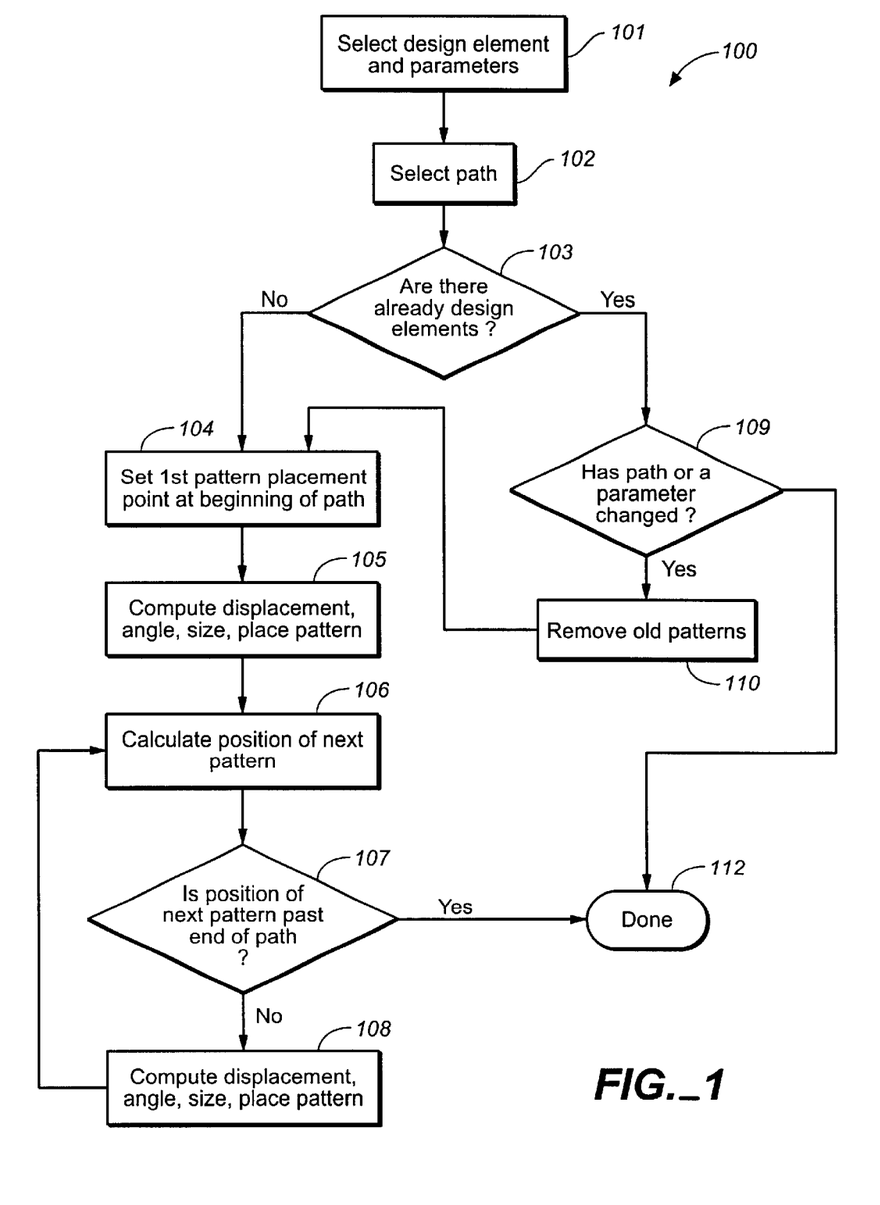
FIG. 1 is a flow diagram of a process for positioning graphical elements according to the invention.

As shown in FIG. 1, in a graphical element placement technique 100 implemented in a system according to the invention, a graphical element and placement parameters are selected (step 101), and the path is drawn or selected in a document (step 102). These steps can be performed in either order. The system then determines whether there are graphical elements already associated with the selected path in the document (step 103). If there are no graphical elements already associated with the path, the system sets the first placement point at the beginning of the path (step 104), computes any displacement from the path, angle of rotation, size alteration, and colors, and positions the graphical element at the determined location. The system then determines the next placement point by advancing along the path the distance specified by the spacing parameter (step 106). If the placement point is not beyond the end of the path (step 107), the system calculates the displacement, angle of rotation, size alteration, and colors, and positions the next graphical element at the determined location (step 108). Steps 106 to 108 are repeated until the system determines that the next placement point would be beyond the end of the path, at which point the operation is complete (step 112).

If graphical elements are already associated with the selected path, the system determines (step 109) whether either the path and/or any parameter has been changed since the graphical elements were initially positioned. If so, the existing graphical elements are removed or erased (step 110), and new graphical elements calculated and positioned as described above. Alternatively, the system can check each existing graphical element to see if it falls within the parameters and path, and change only graphical elements that do not fall within the specified ranges.

Figure 2:
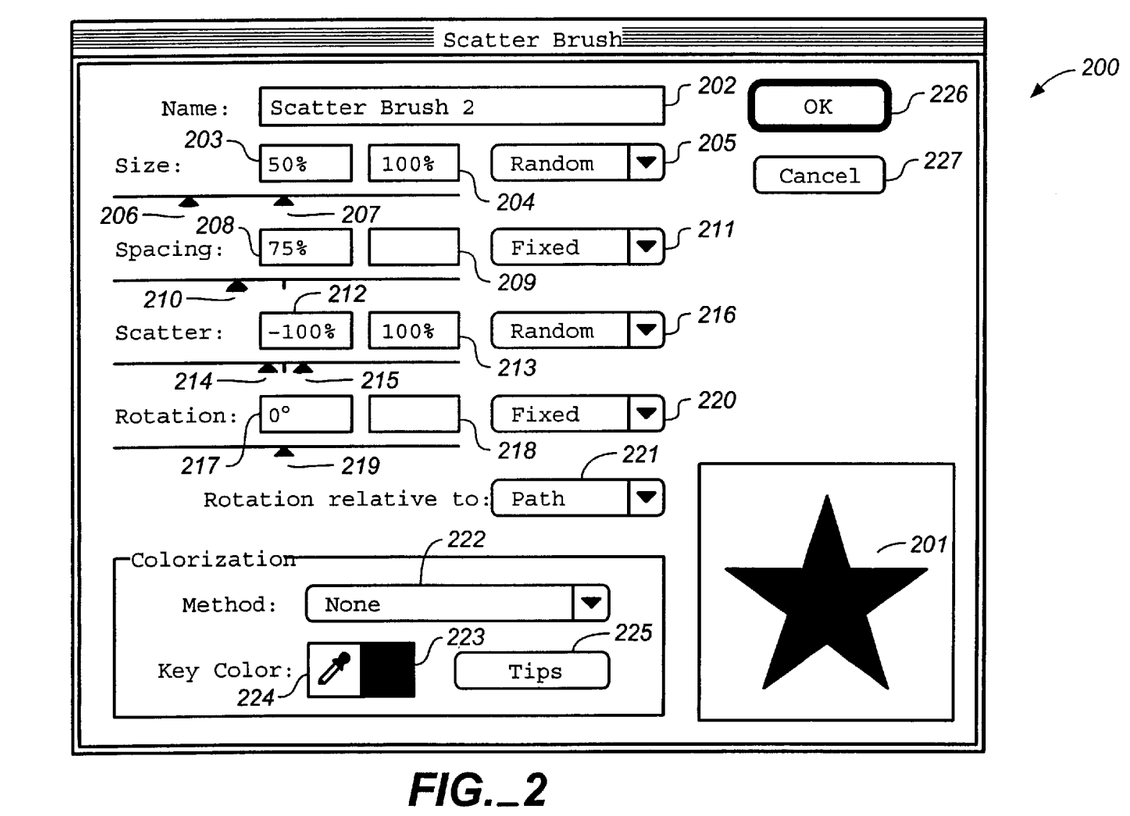
FIG. 2 is an illustration of an exemplary user interface for implementing methods of the invention.

FIG. 2 shows a user interface 200 for implementing techniques of the invention. The interface provides a tool for setting or changing parameters for placing graphical elements. The graphical element selected is shown in window 201. The size of the graphical elements may be set by entering a numeric value in either field 203 or 204, or by adjusting indicators 206 and or 207. One can set a range of sizes for the graphical elements by entering a different number in both fields, or by setting the indicators at different values. Drop-down menu 205 provides a menu from which the user can select the method by which the sizes will be varied (for example, at random, increasing with distance along the path, decreasing with distance along the path, increasing or decreasing with curvature of the path, increasing or decreasing with pressure applied to a pressure-sensitive tablet, and the like). The spacing between graphical elements can be set by entering a number in one or both of fields 208 and 209, or by adjusting the position of indicator 210 or upper spacing limit indicator (not shown). The user can set a range of spacing distances by specifying lower and upper bounds in fields 208 and 209 respectively, or by adjusting the lower limit indicator 210 and the upper limit indicator (not shown). Drop-down menu 211 provides a menu from which the user can select the method by which the spacing will vary within the range set, for example, randomly, increasing along the path, and the like as mentioned above. Fields 212 and 213 (and indicators 214 and 215) permit the user to specify lower and upper limits for lateral displacement or scatter from the selected path. As with the size and spacing controls, entering upper and lower limits indicates a range of values for the system to apply, while entering a single number in a field indicates that all graphical elements are to be displaced a uniform amount. Drop-down menu 216 provides a menu from which the user can select the method by which the scatter will vary within the range set, for example, randomly, increasing along the path, and the like as mentioned above. Fields 217 and 218 (and indicator 219) permit the user to specify lower and upper limits for rotation of the graphical elements. As with the size and spacing controls, entering upper and lower limits indicates a range of values for the system to apply, while entering a single number in a field indicates that all graphical elements are to be rotated a uniform amount. Drop-down menu 220 provides a menu from which the user can select the method by which the rotation will vary within the range set, for example, randomly, increasing along the path, and the like as mentioned above. Drop-down menu 221 permits the user to specify whether the angle of rotation will be calculated from the page, or relative to the path. Drop-down menu 222 provides a menu from which the user can select a color effect to apply, for example to apply a color to the path and to alter the colors of the associated graphical elements as described in commonly-owned copending U.S. patent application Ser. No. 09/056,933, filed Apr. 6, 1998, entitled "RECOLORING ART WORK" incorporated herein by reference in full. Window 223 indicates the color that will/would be applied, and can be configured to activate a palette tool. Icon 224 activates an eyedropper tool, by which the user can select the color of any region the user indicates with a pointing device (for example, a mouse or graphic tablet). Button 225 activates a "help" function, to provide the user with assistance configuring tool 200. The set parameters can be saved as a tool configuration by inserting a name in input field 202. Once the parameters are set, the user then activates the tool by activating button 226 (or cancels the operation at any time by activating button 227).

Figure 3:
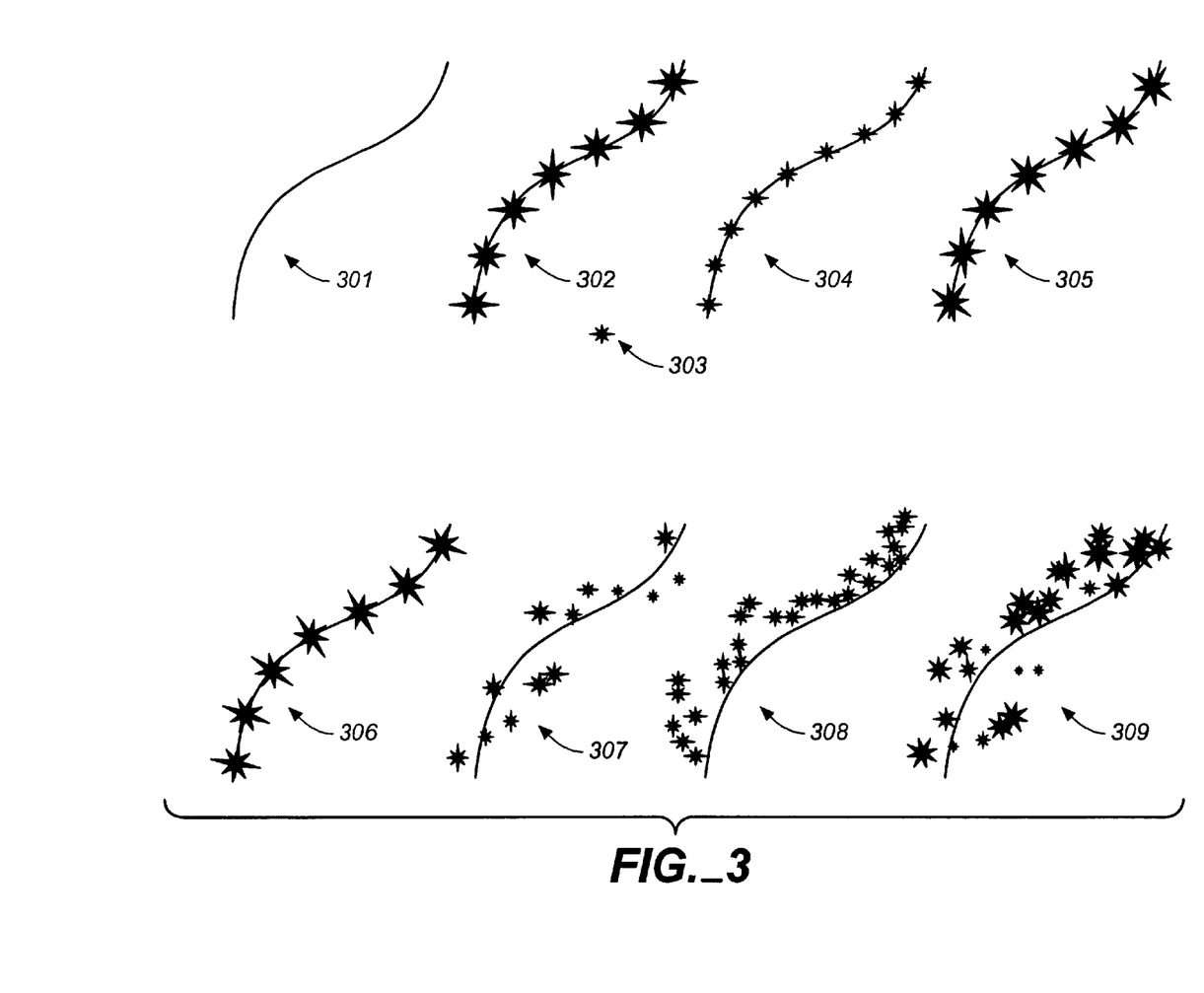
FIG. 3 is an illustration of a path with graphical elements placed and edited using a method of the invention.

FIG. 3 shows a path with graphical elements placed using techniques of the invention. Path 301 is selected in an electronic document. A plurality of graphical elements (here in the form of stars) 303 are applied at 100% size, 100% spacing (spacing the same size as the graphical element), 0% dispersion, and 0° rotation. Graphical elements 304 are adjusted to 50% size, spacing 75%, 0% dispersion, and 0° rotation. Graphical elements 305 are adjusted to 100% size, 100% spacing, 0% dispersion, and rotation −45° to +45° (random) relative to the page. Graphical elements 306 are adjusted to 100% size, 100% spacing, 0% dispersion, and rotation 0° relative to the path. Graphical elements 307 are adjusted to size 25% to 75% (random), 50% spacing, dispersion −60% to +60% (random), and rotation 0° relative to the page. Graphical elements 308 are adjusted to 50% size, 25% spacing, dispersion 0% to 100% (random), and rotation 0° relative to the page. Graphical elements 309 are adjusted to size 10 to 100% (random), spacing 25%, dispersion −100% to +100% (random), and rotation −45° to +45° relative to the page.

Figure 4:
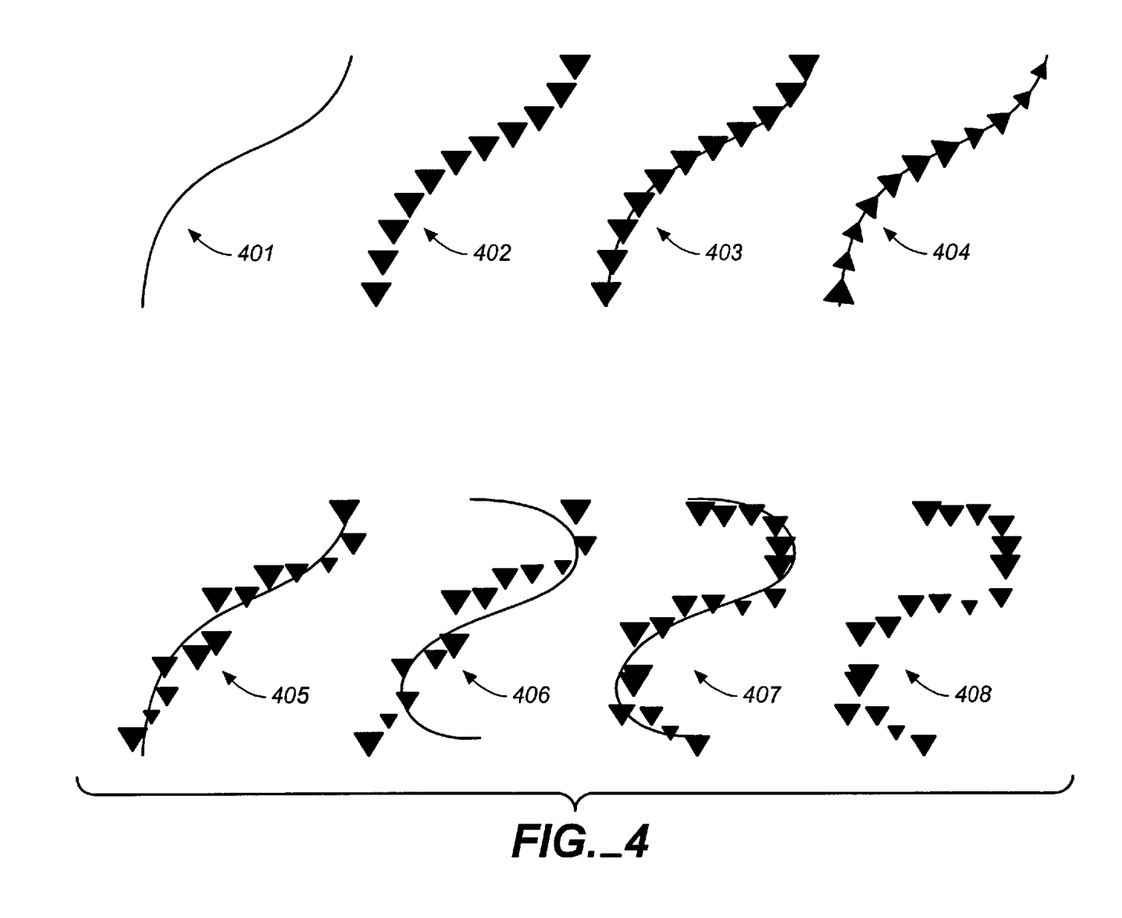
FIG. 4 is an illustration of a path with graphical elements placed and edited using a method of the invention.

FIG. 4 shows a path with graphical elements placed and edited using techniques of the invention. The user selects a path 401 and a graphical element 402 (here in the form of triangles) and invokes a method of the invention through a user interface of a drawing program, for example Adobe Illustrator®. The path disappears from view once the graphical elements are positioned, leaving a string of graphical elements 402. If the user then selects one of the graphical elements, the path reappears, and the path is indicated as selected 403. The user can then modify one or more of the parameters, and apply the new parameters to the selected graphical elements. For example, in set 404 the size distribution and orientation of the graphical elements has been changed, from 100% size to 75–100% size, and from orientation with respect to the page to orientation relative to the path. Another example is illustrated in 405, in which dispersion has been added. The user can also select the path, and alter the shape of the path, for example as illustrated in path 406. After the path shape is altered, the system recalculates the positions of the graphical elements and either replaces them according to the currently-active parameters, or moves the existing graphical elements into position along the new path 407. When the editing focus moves away from the path, the path representation disappears from view, leaving only the associated graphical elements 408 visible.

One can also adjust the color of all graphical elements associated with a selected path. This is achieved by implementing another aspect of the invention, in which the path itself can be assigned a color. The path is not normally visible unless it is being edited. However, the act of changing the color assigned to the path can be given the effect of altering the colors of all graphical elements associated with the path. Techniques for assigning colors to a path, and for altering the colors of associated graphical elements are disclosed in the commonly-owned copending application cited above.

Figure 5:
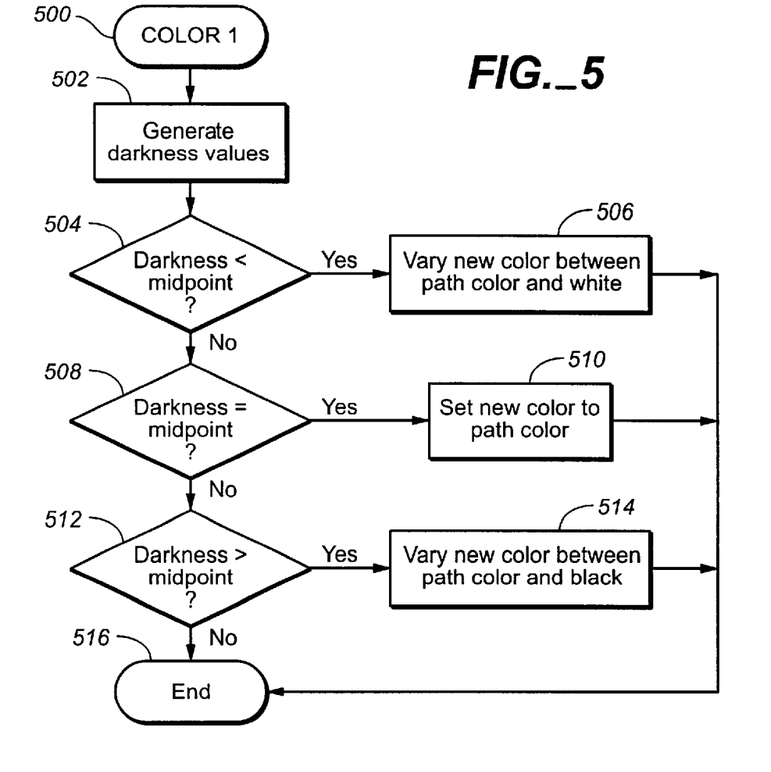
FIG. 5 is a flow diagram of a process for altering colors of graphical elements in an enhanced path.

FIG. 5 shows a process 500 for altering component colors of graphical elements associated with a path is shown. Generally, colors in a color model specification are given in a particular color space. Color spaces are sets of color components that can be combined to create any color in the color space's gamut. Examples are the red green blue (RGB) color space and the cyan magenta yellow black (CMYK) color space. In addition to these device-dependent color spaces there are device independent color spaces such as CIE L*a*b*.

For each component color of the graphical element, the process 500 initially generates a darkness value (step 502) and a new color is generated based on the darkness value. Thus, if the darkness value is less than a predetermined threshold, such as a midpoint between a black value (which may be represented as 1) and a white value (which may be represented as 0) (step 504), the process 500 generates a new color which varies between the stroke color and the white value (step 506). Alternatively, in the event that the darkness value equals the threshold value (step 508), the process 500 sets the new color to the path color (step 510). Alternatively, in the event that the darkness value exceeds the threshold (step 512), the process 500 generates a new color which varies between the path color and the black value (step 514). From step 506, 510, 512 or 514, the process 500 exits (step 516).

Figure 6:
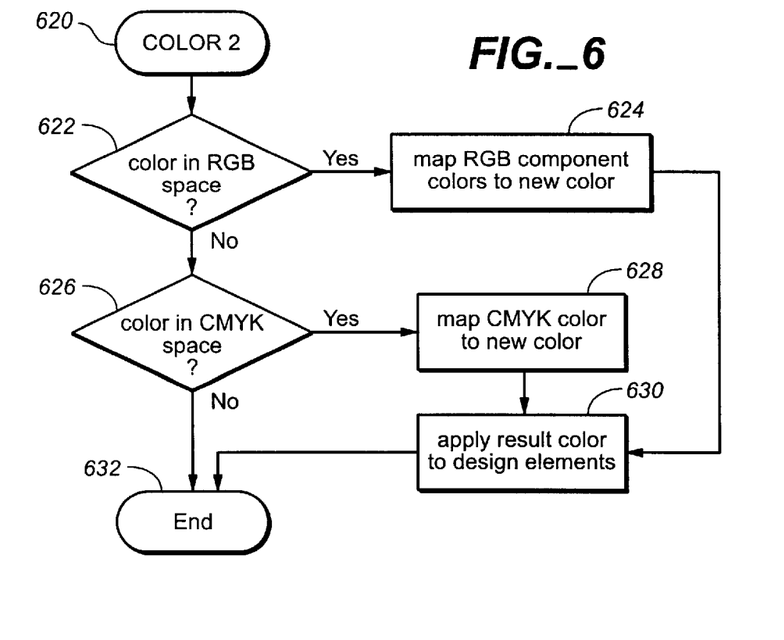
FIG. 6 is a flow diagram of an alternate process for altering colors of graphical elements in an enhanced path.

FIG. 6 shows a second process 620 for altering component colors of graphical elements associated with path. For each component color of the path, the process 620 initially tests whether the path color is in a red green blue (RGB) color space (step 622). If so, the process 620 converts the component colors to the RGB color space and maps each of them to a new color in the RGB color space.

Alternatively, in the event that the path color is not in the RGB color space, the process 620 further checks whether the path color is in a cyan magenta yellow or black (CMYK) color space (step 626). From step 626, if the path color is not in the CMYK color space, the process exits (step 632). Otherwise, the process 620 converts the component colors to the CMYK color space and maps each of them to a new color in the CMYK color space (step 628). From step 624 or step 628, the process 620 applies the result color to the graphical elements (step 630) before exiting (step 632).

Alternatively, one can use a third process for altering component colors of graphical elements associated with a path. In this process, if a component's color has a hue that has a particular relationship to the hue of the key, the chosen color is a color that has a similar relationship to the hue of the stroke color. For each component color of the graphical element, the process initially converts the color of the components of the graphical element into a hue, saturation and brightness (HSB) color space.

The hue component of HSB space is highly nonlinear to the human vision system. The colors of the spectrum appear approximately in the following order: red:0, orange:0.08, yellow:0.16, green:0.33, cyan:0.50, blue:0.66, magenta:0.83, red:1 (full circle). The red to yellow section changes much more rapidly than the green-blue section. Additionally, there are wide stretches in the green and blue areas with no visible color change. To compensate for this uneven rate of change, the process biases the hue values of the key color, paint color and the element color. The process then maps the biased hue values. Next, the process shifts the hue values by adding a paint hue to a target hue and subtracting a key hue. Next, the process maps saturation values and brightness values. Next, the process unbiases the hue value, and converts the result into the original color space of the path color. Finally, the process applies the result color to individual components of the graphical element derived from the component of the original element.

To bias the hue space, take the input hue value (between 0 and 1) and linearly interpolate in the following table shown below for reference:

| Hue | Biased hue | Color |
|---|---|---|
| 0 | 0 | Red |
| 1/12 | 0.17 | Orange |
| 1/6 | 0.34 | Yellow |
| 1/3 | 0.46 | Green |
| 1/2 | 0.6 | Cyan |
| 2/3 | 0.76 | Blue |
| 5/6 | 0.91 | Magenta |
| 1 | 1 | Red (again) |

Linear interpolation in this table is one way to bias the hue space. Other ways may be used, including a different table, or a more complex interpolation than a simple linear interpolation may be used. By biasing the hue space, uneven changes are smoothed out. The result of this bias is that changes in the red/orange/yellow area (0–1/6) are stretched out, while changes in other areas are compressed. To unbias the hue space, the interpolation process is performed in reverse.

The basic mapping function is that if hue A is mapped to hue B, then hue C becomes hue B+(C−A). A difference between C and A is taken and the difference is applied to hue B. To illustrate, assume a graphical element has 2 colors, hue 0 (red) and hue 0.08 (orange). These colors are mapped so that red becomes 0.33 (bright green). Without biasing, the orange becomes 0.42 (=0.33+0.08−0), which is a shade of green that is visually almost identical to the 0.33 green. A very visible difference has been almost eliminated.

Conversely, assume a graphical element has 2 colors, 0.22 (a yellow-green) and 0.38 (a bright green). These colors are visually distinct but similar. These colors are mapped so that the yellow-green becomes red (hue 0). Without biasing, the saturated green becomes 0.16 (=0+0.38−0.22), a saturated yellow that visually is nowhere close to red. Two colors that were close together have become very different.

In the first example, the result of biasing 0 and 0.08 are 0 and 0.17. 0 is shifted to 0.46 (the result of biasing 0.33), which makes 0.17 become 0.63 (=0.46+0.17−0). The bias is then reversed, which makes 0.46 become 0.33 and 0.63 become 0.53, a light blue color. The visual relationship between red and orange is thus preserved, resulting in green and light blue.

In the second example, the result of biasing 0.22 and 0.38 are 0.39 and 0.5. 0.39 is shifted to 0 (the result of biasing 0), which makes 0.5 become 0.11 (=0+0.5−0.39). The bias is then reversed, which makes 0 become 0 and 0.11 become 0.05, an orange red. The visual relationship between yellow-green and green is thus preserved, resulting in red and orange-red.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can advantageously be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

Other embodiments are within the scope of the following claims. For example, the order of performing steps of the invention can be changed by those skilled in the art and still achieve desirable results.

What is claimed is:

1. A computer-implemented method for drawing in an electronic document, the method comprising:

providing an enhanced path defining a placement pattern for placement of copies of a graphical element in an electronic document, the enhanced path including a graphical element, a spatial path, and a set of one or more variable reproduction parameters specifying how copies of the graphical element are to be displayed simultaneously along the path in a single, static image, the variable reproduction parameters including one or more of a spacing parameter specifying a variable separation between adjacent copies of the graphical element along the spatial path or a displacement parameter specifying a variable displacement of the copies of the graphical element from the spatial path;

drawing copies of the graphical element in the electronic document at a first set of positions defined by the placement pattern;

in response to a user request, editing the enhanced path by modifying at least one of the spatial path or one or more of the set of variable reproduction parameters to define a modified placement pattern; and redrawing copies of the graphical element in the electronic document at a second set of positions defined by the modified placement pattern;

wherein at least one of the placement pattern or the modified placement pattern provides for placement of copies of the graphical element such that at least a first pair of adjacent copies are separated by a first spacing that is different from a second spacing separating a second pair of adjacent copies, or such that at least a first copy is displaced from the spatial path by a first displacement that is different from a second displacement by which a second copy is displaced from the spatial path.

2. The method of claim 1, wherein editing the enhanced path includes altering the spatial path.

3. The method of claim 1, wherein editing the enhanced path includes altering a parameter.

4. The method of claim 3, wherein editing the enhanced path includes altering a plurality of parameters.

5. The method of claim 1, wherein the parameters include: size of the copies, size range of the copies, method by which the size is determined within a range, spacing of the copies, spacing range of the copies, method by which the spacing is determined within a range, angle of rotation, range of rotation angles, method by which the rotation angle is determined within a range, and whether rotation angle is measured from the path or from the document.

6. The method of claim 5, wherein the parameters further include displacement from the path, range of displacement from the path, method by which the displacement is determined within a range, and color.

7. The method of claim 1, wherein the first and second sets of positions are different.

8. Apparatus comprising a computer-readable storage medium tangibly embodying program instructions defining a computer program application for performing operations on an electronic document in response to input from a user of the apparatus, the program comprising instructions operable for causing a computer to:

draw repeated simultaneous copies of a selected graphical element in a single, static image at a first set of positions relative to a selected spatial path in accordance with a set of one or more variable reproduction parameters set by a user to provide an enhanced path defining a placement pattern for placement of copies of the graphical element in the image, the variable reproduction parameters including one or more of a spacing parameter specifying a variable separation between adjacent copies of the graphical element along the spatial path or a displacement parameter specifying a variable separation of the copies of the graphical element from the spatial path;

in response to input from a user, alter the enhanced path by altering at least one of the spatial path or one or more of the set of variable reproduction parameters to define an altered placement pattern; and redraw repeated simultaneous copies of the selected graphical element in the static image at a second set of positions defined by the altered placement pattern;

wherein at least one of the placement pattern or the altered placement pattern provides for placement of copies of the graphical element such that at least a first pair of adjacent copies are separated by a first spacing that is different from a second spacing separating a second pair of adjacent copies, or such that at least a first copy is displaced from the spatial path by a first displacement that is different from a second displacement by which a second copy is displaced from the spatial path.

9. The apparatus of claim 8, wherein the input from the user comprises a request to alter the enhanced path by changing a parameter.

10. The apparatus of claim 7, wherein said program further comprises instructions to provide a user interface having a plurality of input controls that enable the user to set the parameters.

11. The apparatus of claim 7, wherein the parameters include size of the copies, spacing of the copies, displacement of the copies from the path, angle of rotation of the copies, and color of the copies.

12. The apparatus of claim 10, wherein the parameters further include size range of the copies, method by which the size of a particular copy is determined within a range, spacing range of the copies, method by which the spacing of copies is determined within a range, range of displacement from the path, method by which the displacement of copies from the path is determined within a range, range of rotation angles, method by which the rotation angle of copies is determined within a range, and whether rotation angle is measured from the path or from the document.

13. The apparatus of claim 8, further comprising instructions to alter the colors of the copies in response to input from a user changing, the color of the path.

14. The apparatus of claim 13, further comprising instructions to:

compute a darkness value for the path;

compare the computed darkness value to a preset threshold value;

map each color in the graphical element to a new color, wherein the new color is between white and the path color if the darkness value is between white and the threshold value, the new color is set to the path color if the darkness value is equal to the threshold value, and the new color is set to a color between the path color and black if the darkness value is between the threshold value and black.

15. The apparatus of claim 13, further comprising instructions to:

determine the color space of the graphical element component colors; and map the graphical element component colors to other colors in the same color space.

16. The apparatus of claim 13, further comprising instructions to:

convert the color of graphical design components into a hue, saturations and brightness (HSB) color space;

bias hue values of a key color, a graphical element color, and a path color;

map the hue values of the key color, the graphical element color, and the path color;

transform saturation and brightness values;

unbias the hue values;

convert the resulting color into original color space of the path color; and apply the resulting color to components of graphical elements.

17. The apparatus of claim 8, wherein the program displays a user interface comprising:

a plurality of input fields capable of accepting numeric values that specify parameters selected from the group consisting of size of the copies, size range of the copies, spacing of the copies, spacing range of the copies, displacement from the path, range of displacement from the path, angle of rotation, and range of rotation angles; and a plurality of menu elements capable of indicating parameters selected from the group consisting of method by which the size is determined within a range, method by which the spacing is determined within a range, method by which the displacement is determined within a range, method by which the rotation angle is determined within a range, and whether rotation angle is measured from the path or from the document.

18. The apparatus of claim 17, wherein the user interface further comprises means by which the user can specify a color for the path.

* * * * *

UNITED STATES PATENT AND TRADEMARK OFFICE
CERTIFICATE OF CORRECTION

PATENT NO. : 6,310,622 B1  
DATED : October 30, 2001  
INVENTOR(S) : Paul J. Asente It is certified that error appears in the above-identified patent and that said Letters Patent is hereby corrected as shown below:

<u>Title page,</u>  
Item [56], References Cited, OTHER PUBLICATIONS,  
After "FreeHand 5.0 User Manual, Macromedia," please delete "Chaters" and insert -- Chapters -- therefor.

<u>Column 9,</u>  
Line 58, please delete "claim 7" and insert -- claim 8 -- therefor.  
Line 62, please delete "claim 7" and insert -- claim 8 -- therefor.  
Line 66, please delete "claim 10" and insert -- claim 11 -- therefor.

Signed and Sealed this

Ninth Day of July, 2002

*Attest:*

*Attesting Officer*

JAMES E. ROGAN  
*Director of the United States Patent and Trademark Office*